United States Patent [19]

Nakayama et al.

[11] Patent Number: 5,315,447
[45] Date of Patent: May 24, 1994

[54] DISK CONTROL METHOD OF FORMAT WRITE OPERATION USING DATA DISTANCE ON A TRACK

[75] Inventors: Masahiro Nakayama; Hisaharu Takeuchi; Mamoru Tohchi; Satoshi Numakura, all of Odawara, Japan

[73] Assignee: Hitachi, Ltd., Tokyo, Japan

[21] Appl. No.: 864,381

[22] Filed: Apr. 6, 1992

Related U.S. Application Data

[63] Continuation of Ser. No. 407,421, Sep. 14, 1989, abandoned.

[30] Foreign Application Priority Data

Sep. 16, 1988 [JP] Japan ................................. 63-231866

[51] Int. Cl.⁵ ........................ G11B 5/09; G11B 15/04
[52] U.S. Cl. ........................................ 360/49; 360/60
[58] Field of Search ................ 360/43, 49, 39, 50, 360/72.2; 369/47, 53, 54, 59

[56] References Cited

U.S. PATENT DOCUMENTS

| | | | |
|---|---|---|---|
| 3,801,969 | 4/1974 | Sordello et al. | 360/39 |
| 4,126,887 | 11/1978 | Miyazaki et al. | 360/49 |
| 4,814,904 | 3/1989 | Shigihara et al. | 360/66 |
| 4,939,598 | 7/1990 | Kulakowski et al. | 369/48 |

FOREIGN PATENT DOCUMENTS

61-241824 10/1986 Japan .

Primary Examiner—Donald Hajec
Assistant Examiner—Won Tae C. Kim
Attorney, Agent, or Firm—Kenyon & Kenyon

[57] ABSTRACT

A magnetic disc storage system, in which operation for erasing information otherwise left to remain in succession to data records on a rotatable storage medium during a remaining period of one rotation of the medium is omitted. In response to a command commanding access to the stored data, a table containing the lengths of the stored data is referred to. When it is detected that a record having a storage location commanded to be accessed exceeds the associated stored length of the recorded data, a command error is messaged to a controller of the rotatable storage medium in place of executing the access.

2 Claims, 6 Drawing Sheets

FIG. 6a
```
COMMAND CHAIN 1 FOR WRITE
  1a  —  SEEK CYL HD
  1b  —  SEARCH HA
  1c  —  TIC
  1d  —  WRITE HA
  1e  —  WRITE Ro        ---- RECORD R0
  1f  —  WRITE CKD       ---- RECORD R1
  1g  —  WRITE CKD       ---- RECORD R2
```

FIG. 6b
```
COMMAND CHAIN 2 FOR READ
  2a  —  SEEK CYL HD
  2b  —  READ HA
  2c  —  READ Ro         ---- RECORD R0
  2d  —  READ CKD        ---- RECORD R1
  2e  —  READ CKD        ---- RECORD R2
```

FIG. 6c
```
COMMAND CHAIN 3 FOR WRITE
  3a  —  SEEK CYL HD
  3b  —  SEARCH HA
  3c  —  TIC
  3d  —  WRITE HA
  3e  —  WRITE Ro        ---- RECORD R0
  3f  —  WRITE CKD       ---- RECORD R1
```

FIG. 6d
```
COMMAND CHAIN 4 FOR OLD DATE IN RECORD R2
  4a  —  SEEK CYL HD
  4b  —  SET SECTOR
  4c  —  SEARCH ID       ---- RECORD R2
  4d  —  TIC
  4e  —  READ CKD        ---- RECORD R2
```

FIG. 7

DISK CONTROL METHOD OF FORMAT WRITE OPERATION USING DATA DISTANCE ON A TRACK

This application is a continuation of application Ser. No. 07/407,421, filed on Sep. 14, 1989 now abandoned.

BACKGROUND OF THE INVENTION

The present invention generally relates to a magnetic disc system and a control technique therefor and more particularly to a technique which can effectively and profitably be applied to a control of a format write operation performed upon writing of data on a storage (recording) medium.

In a magnetic disc system which may be employed, for example, as an external storage device or equipment of an electronic computer system or the like, it is known that data are stored or recorded on a plurality of circular tracks provided concentrically on a rotatable magnetic disc serving as the storage medium by means of a magnetic head adapted to be positioned above a desired one of the tracks.

In this conjunction, it is noted that when a file or the like is to be implemented in a magnetic disc, a so-called format write operation for writing such control information as storage location of data on the recording medium or disc and on the track, the length of the data and other information is required to be performed simultaneously with the recording of the data. Further, with a view to preventing erroneous data reading in the future from the track for which the format writing of the control information has been performed, erasing operation is commonly practiced in succession to the format write operation for erasing the old data which may remain in the region located outside of the range where the format write operation has validly been performed on each of the tracks. However, performing such an erasing operation on the remnant or remaining region of the track means that the time required for restrainingly holding the magnetic head to the track is correspondingly lengthened. This involves an increase in the overall time taken for the input/output of data to or from the magnetic disc system itself and thus presenting a cause for degradation in the performance of the whole computer system inclusive of the magnetic disc system.

Under the circumstances, there has been developed a technique for protecting the system performance against degradation due to the erasing operation carried out in succession to the format write operation in the magnetic disc system, as disclosed, for example in U.S. Pat. No. 3,801,969 corresponding to Japanese Patent Publication JP-B-56-17692. According to this known technique, arrangement is made such that the erasing operation is performed internally within the magnetic disc system itself after the format write operation without resorting to the aid of a magnetic disc controller employed for controlling the magnetic disc system, to thereby spare the time for which the magnetic disc controller is occupied by the magnetic disc system.

Further, according to the technique disclosed in JP-A-61-241824, it is attempted to reduce the time taken for the format write operation by avoiding a duplicate erasing operation for a region for which the erasing operation has once been performed.

In either of the prior art techniques mentioned above, the erasing operation is still necessarily required more or less in succession to the format write operation. Thus, the magnetic disc system is placed in the occupied state at least until the erasing operation has been completed and is rendered to be incapable of reading other recorded data or executing a move or a like command of the magnetic head during the erasing period. In other words, the prior art magnetic disc system still suffers from the problem that a lot of time is taken for the data input/output operation as a whole, being accompanied by degradation in the utilization efficiency of the magnetic disc system as well as the data stored therein.

SUMMARY OF THE INVENTION

The present invention provides a magnetic disc system which is capable of improving the utilization efficiency of the system as well as the data stored therein by making unnecessary the erasing operation in succession to the format write operation.

The present invention also provides a control method for a magnetic disc system which method allows the time taken for the format write operation to be reduced while increasing the amount of data transferred between the magnetic disc system and a utilization apparatus or system provided externally of the magnetic disc system.

The present invention also provides a magnetic disc control system in which the erasing operation conventionally performed in succession to the format write operation can be spared or omitted without any fear that old data possibly remaining in the region of the track which has undergone the rewrite operation might be erroneously accessed.

The magnetic disc system according to the present invention is so designed that the data stored in each of the individual tracks on the magnetic disc serving as the storage medium is controlled or managed on the basis of control information recorded on the associated track through the format write operation, wherein storage means is provided for recording the valid range of the format write operation in each of the tracks.

According to a preferred embodiment of the invention, distance between the start of a track of concern and the control information on that track which is associated with the last data recorded through the format write operation is stored in a storage means as the valid range, wherein the format write operation is completed without performing the erasing operation for the remaining region of the track. Upon making access to a track of concern, the valid range recorded or stored in the storage means is referred to. It is possible to thereby make the decision as to whether or not the data of concern belongs to the valid region generated through the format write operation, to thereby positively inhibit any access to the invalid data possibly remaining outside of the range for which the format write operation has been executed.

By virtue of the arrangement proposed by the present invention, the erasing operation conventionally performed in succession to the format write operation in the prior art magnetic disc system can be omitted without any fear that invalid data might erroneously be accessed in the future. Thus, the time for which the magnetic disc system is occupied is reduced by an amount corresponding to the time otherwise taken for the erasing operation, which in turn means that the utilization efficiency of the magnetic disc system as well as the data stored therein can be enhanced.

Further according to the control method for the magnetic disc system of the present invention, it is possible that upon execution of the format write operation for a track of concern, the distance between the start of the track and the control information corresponding to the last data recorded through the format write operation is stored as the valid range, whereon the format write operation is completed without performing the erasing operation for the remaining region of the track, while upon making access to the track, the valid range stored in the storage means is referred to for making decision as to whether data of concern lies within the valid range as recorded or stored through the format write operation, whereby the invalid data possibly remaining in the other track region than that for which the format write operation has been performed can be positively prevented from being erroneously accessed.

By virtue of the features of the present invention, the erasing operation conventionally required in association with the format write operation can be omitted without any worry of invalid data that possibly remain on the track being erroneously accessed, whereby the time taken for the format write operation can be diminished by an amount corresponding to the time otherwise required for the erasing operation.

DETAILED DESCRIPTION

The present invention will now be described in detail in conjunction with an exemplary or preferred embodiment thereof with reference to the accompanying drawings.

Figure 1:
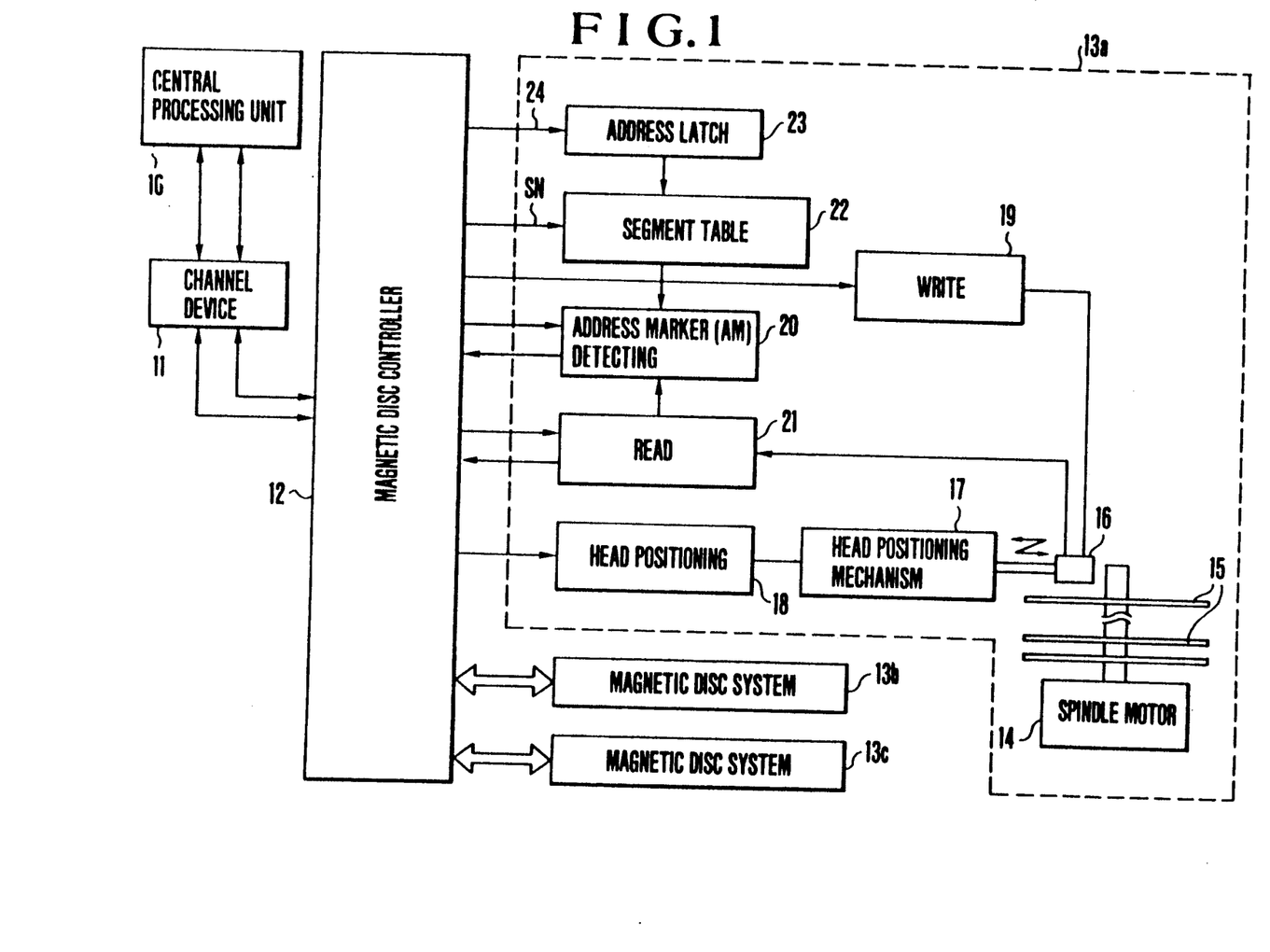
FIG. 1 is a block diagram showing, by way of example only, a general arrangement of an electronic computer system to which a magnetic disc system control method according to an exemplary embodiment of the invention may be applied.

First referring to FIG. 1, an electronic computer system according to an embodiment of the present invention is composed of a central processing unit 10 for performing predetermined processings on the information of concern as well as performing control operation for the whole system; an input/output channel 11 for performing input/output control of data transferred with external devices or equipment in place of the above mentioned central processing unit 10 in accordance with command chains each including a group of commands issued by the central processing unit 10, and a plurality of magnetic disc systems 13a to 13c adapted to serve for recording or storage of the data sent out from the central processing unit 10 as well as reproduction of the data required by the central processing unit 10.

In the case of the illustrated embodiment, the magnetic disc systems 13a to 13c have internal structures which are identical with one another. Accordingly, the internal structure only of the magnetic disc systems, 13a, shown in FIG. 1 will be briefly described below as the representative of the others.

Figure 7:
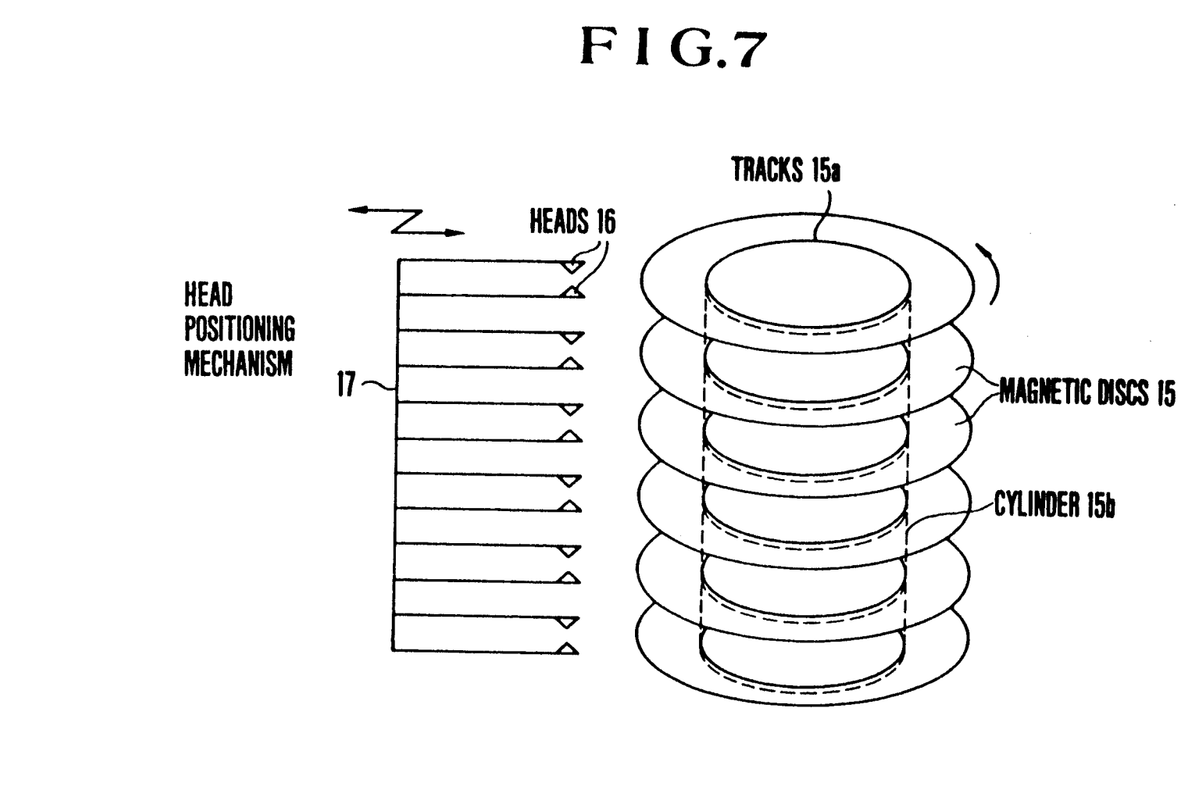
FIG. 7 is a conceptual diagram for illustrating the concept of a cylinder in the magnetic disc system illustrated.

The magnetic disc system 13a includes a plurality of magnetic discs 15 mounted fixedly on a spindle motor 14 coaxially therewith and in parallel with one another so as to be rotated at a predetermined speed, and a plurality of magnetic heads 16 (only one of which is shown in FIG. 1) provided in association with recording surfaces of the individual magnetic discs 15, respectively, wherein each of the heads is adapted to be movable in the radial direction relative to the associated record disc surface to thereby recording and reproduce information on any from and given one of plural tracks 15a formed circularly in a coaxial array on the recording surface (FIG. 7).

The plurality of magnetic heads 16 are fixedly mounted on a head positioning mechanism 17, the operation of which is controlled by a head positioning circuit 18 adapted to control displacement and speed of the head positioning mechanism 17 in accordance with commands issued by a magnetic disc controller 12 of higher rank (i.e. located upstream of the head positioning circuit 18 in the head control loop).

More specifically, the head positioning circuit 18 is so designed as to be capable of displacing simultaneously the plurality of magnetic heads 16 secured to the head positioning mechanism 17 in a same direction radially of the plural magnetic discs 15 for thereby positioning simultaneously the individual magnetic heads 16 on the designated tracks which are located with an equal distance from the center of rotation of the magnetic discs in accordance with a command generated by the high rank disc controller 12. Such positioning operation is commonly known as a "seek operation".

In the magnetic disc system, a group of the tracks 15a that are located with an equal same distance from the center of rotation of the individual magnetic discs 15 and can be accessed rapidly by the associated magnetic heads 16 through a single head selecting operation without performing the seek operation are usually managed in terms of a cylinder 15b defined by the abovementioned tracks 15a, as is illustrated in FIG. 7, wherein data storing operation is performed in such a manner that the plurality of tracks 15a defining the cylinders 15b, respectively, are sequentially filled with the data. According to this principle, the time taken for making access to the data of concern can be significantly reduced.

Turning back to FIG. 1, the magnetic disc system 13a further includes among others a data write circuit 19 for recording on the magnetic disc 15 the data supplied together with a write command from the central processing unit at a predetermined location thereon by means of the magnetic head 16, an address marker (AM) detecting circuit 20 which responds to a data read command issued by the central processing unit 10 to detect an address marker AM supplied in precedence to the individual data in accordance with a search command for thereby specifying the data of concern, and a data read circuit 21 for reading out the data of concern from the predetermined location of the magnetic disc 15 through the magnetic head 16 positioned at the location of the data of concern on the basis of the detected address marker AM to thereby send the data as read out to the central processing unit 10.

Parenthetically, the conventional magnetic disc system includes in addition to the circuits for the data recording and reproduction mentioned above a control circuit for controlling the seek operation described previously and associated circuitries. However, since these circuits belong to the prior art and do not constitute any essential parts relevant to the present invention, illustration and description of them will be unnecessary.

Figure 4:
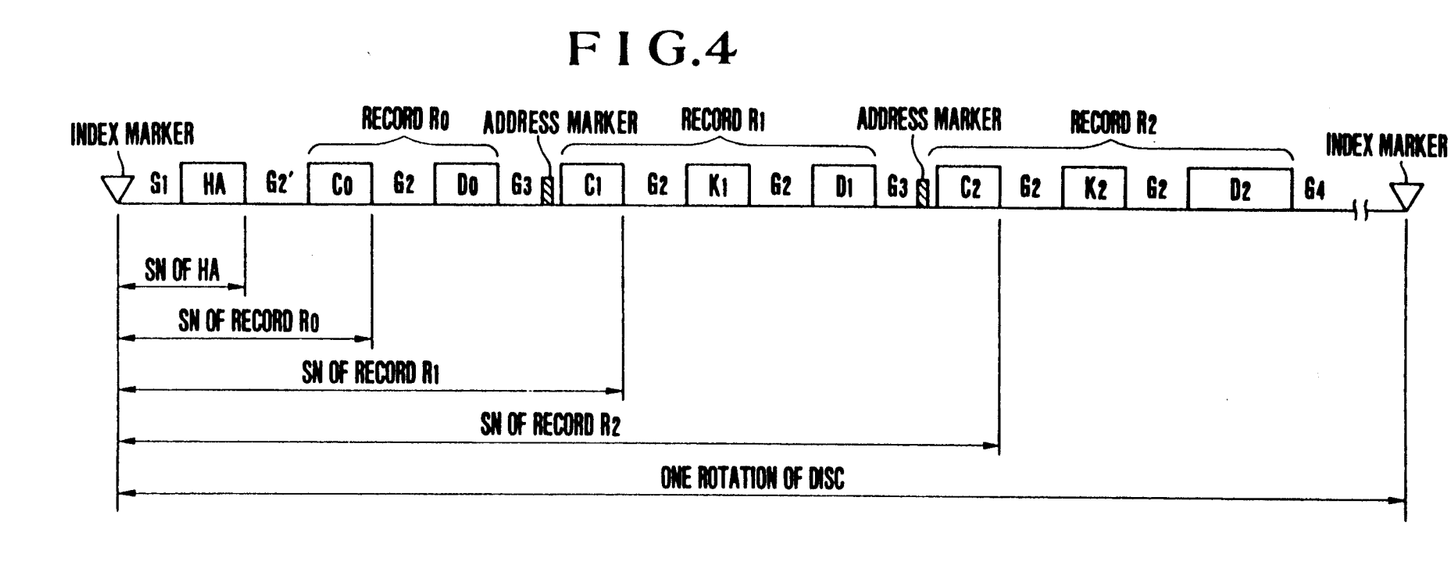
FIG. 4 is a conceptual diagram for illustrating a manner in which data are stored in the magnetic disc system according to an embodiment of the present invention.
Figure 5:
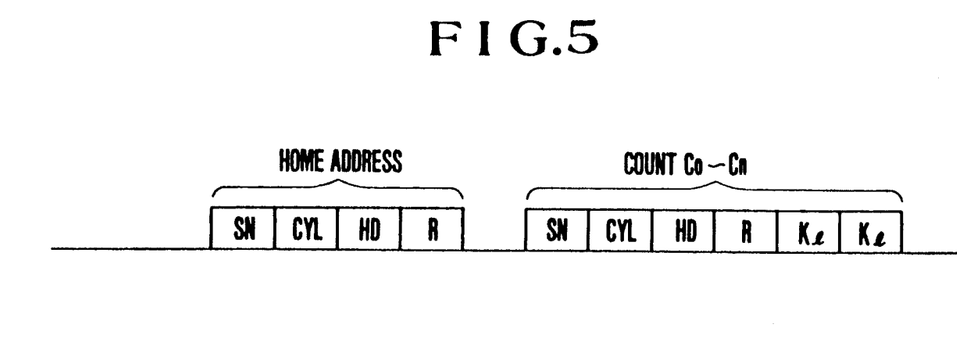
FIG. 5 is a conceptual diagram showing, by way of example, storage formats of control information used in the magnetic disc system according to an embodiment of the invention.

It should however be mentioned that according to the concept of the invention incarnated in the instant embodiment, the data is stored on the individual tracks 15a provided on the magnetic discs 15 in the form of a variable length record based on a so called count/key/-data or CKD format, as illustrated in FIGS. 4 and 5.

More specifically, referring to FIGS. 4 and 5, in each of the individual tracks 15a, there are provided an index marker indicating a start (or an end) of the track 15a and a home address field HA which is disposed with a predetermined gap $G_1$ relative to the index marker IM and in which ID (identification) information is stored. A plurality of records $R_0$ to $R_n$ are stored in succession to the home address HA.

The first or leading record $R_0$ is imparted with a specific role and is composed of a data area $D_0$ and a count area $C_0$ where the ordinary data is not recorded.

On the other hand, the succeeding record fields $R_1$ to $R_n$ are constituted, respectively, by count areas $C_1$ to $C_n$ where control information is recorded, as will hereinafter be described, key areas $K_1$ and $K_n$ where search information for data retrieval is recorded, and data areas $D_1$ to $D_n$ at which ordinary data are recorded, wherein these areas are disposed with a predetermined gap $G_2$ therebetween within each of the records $R_1$ to $R_n$, as can best be seen in FIG. 4.

Further, gaps $G_3$ are provided between the adjacent individual records $R_1$ to $R_n$, respectively. Besides, a gap $G_4$ is provided between the final or last record field (the record $R_2$ in the case of the illustrated example) and the index marker IM. There is disposed in each of the gaps $G_3$ preceding to the individual record fields, respectively, which succeed to the record $R_0$ the address marker AM predicting the arrival of the associated records.

Referring to FIG. 5, there is stored in the home address field HA a segment number SN which will be described later on, a cylinder number CYL identifying the cylinder to which the track 15a of concern belongs, a head number HD identifying the associated magnetic heads and a record number R.

Similarly, the count area C constituting a part of each record has recorded therein the same segment number SN as that of the home address field HA, the cylinder number CYL and the head number HD to which the record of concern belongs, a record number R, a key length $K_l$ of the record of concern, data length $D_l$ and other control information.

In this conjunction, it should be noted that the home address field HA and the discrete count areas $C_0$ to $C_n$ have recorded therein, respectively, the segment numbers SN (in terms of byte numbers) indicating the distances from the abovementioned index marker IM to the trailing end of the home address field HA and those of the count areas $C_0$ to $C_n$.

More specifically, each of the segment numbers SN mentioned above is given as an integral multiple of a unit length (32 bytes in the case of the instant embodiment). Thus, by multiplying the segment number SN of concern with "32", the distance from the index marker IM can be obtained for each of combinations of the heads 0 to n and the cylinders 0 to k illustrated in FIG. 2.

In the case of the ordinary data updating, the individual records $R_1$ to $R_n$ having stored therein the data in the intrinsic sense, the key areas $K_l$ and the data areas $D_l$ are rewritten. On the other hand, when data are newly to be written on a given one of the tracks 15a, a so-called format write operation is performed according to which the abovementioned home address HA and the record area $R_0$ where the control information for the whole track 15a as mentioned hereinbefore is stored as well as the count areas $C_m$. The control information for the individual records $R_1$ to $R_n$ are stored are rewritten together with the information for the the key areas $K_m$ and the data areas $D_m$ (where m=1 to n).

Each of the magnetic disc systems 13a to 13c according to the instant embodiment is equipped with a segment number table 22 (memory means) constituted, for example, by a semiconductor memory for storing a valid range for the abovementioned format write operation, i.e. the segment number representing the physical positional information indicating the distance from the index marker IM to the last record on the track for which the format write operation is to be performed.

This segment number table 22 contains entries 22a (see FIG. 2) in a number corresponding to a total number of tracks (equal to a product obtained by multiplying the number of the cylinders with the number of the magnetic heads) provided in the plurality of magnetic discs 15, wherein the entries 22a constitute the segment number table having the abscissa along which the cylinder numbers are taken and the ordinate along which the head numbers are taken. Upon every completion of the format write operation for each of the individual tracks 15a, the segment number SN in the count area of the final or last record on the track 15a for which the format write operation has been performed is stored at the corresponding entry 22a, while the entries 22a corresponding to those tracks for which the format write operation is not yet performed are placed with zeros respectively.

The segment number SN is arithmetically determined by the magnetic disc controller 12 according to the instant embodiment.

More specifically, the segment table memory 22 is equipped with an address latch 23 as a peripheral device for holding an address with an address signal generated on the basis of the cylinder number CYL and the head number HD and outputted from the magnetic disc controller 12 in association with the track 15a for which the format write operation is to be performed. Stored at the entry 22a specified by the address signal 24 are the segment numbers SN of the home address HA and the count areas of the individual records which are arithmetically determined by the magnetic disc controller 12. By designating the address of the track 15a to which the record of concern belongs with the aid of the segment table, reading of the current segment numbers SN of the relevant track 15a is made possible.

Next, operation of the system according to the instant embodiment of the invention will be elucidated.

In the first place, referring to FIGS. 6(a) to (d), description will briefly be made of the command chains 1 to 4 employed in the system according to the instant embodiment.

Figure 6A:
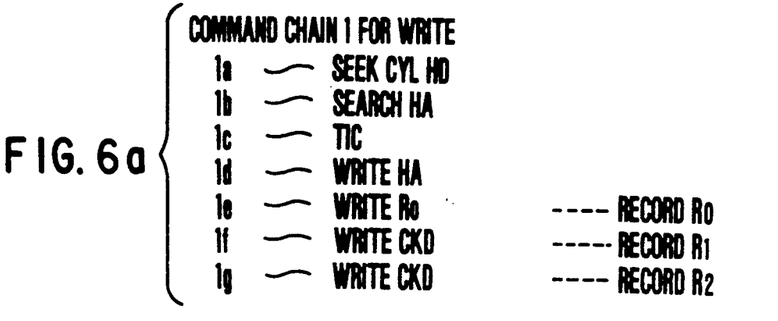
FIGS. 6(a) to 6(b) are charts for illustrating, by way of example only, a plurality of command chains employed in input/output operation control in the magnetic disc system according to an embodiment of the present invention.

A command chain 1 for write operation is composed of a SEEK CYL HD command 1a commanding the positioning of the magnetic heads in group relative to a cylinder 15b to which the track 15a belongs, a SEARCH HA command 1b for allowing the magnetic head to search the home address HA, a TIC command 1c for causing the abovementioned search operation to be repeated for a predetermined number of times and waiting for completion of the search operation, a WRITE HA command 1d commanding the rewriting of the home address HA, a WRITE $R_0$ command 1e commanding the rewriting of the record $R_0$, and WRITE CKD commands 1f and 1g commanding the rewriting of the count areas, key areas and the data areas of the records $R_1$ and $R_2$, respectively.

In other words, the command chain 1 mentioned above is employed for performing the format write operation for rewriting the control information for the track 15a of concern stored at the home address HA and the count areas of the individual records upon writing of new data for the track 15a of concern.

Figure 6B:
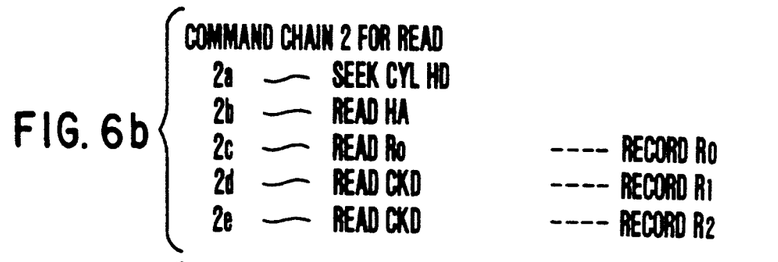

A command chain 2 for data read operation is composed of a SEEK CYL HD command 2a for moving the magnetic heads to the cylinder 15 including the track of concern and a READ HA command 2b, a READ $R_0$ command 2c and READ CKD commands 2d and 2e for allowing the reading operation to be sequentially performed for the home address HA and the records $R_0$ to $R_2$ for thereby execute the reading operation for the start or leading record $R_0$ to the record $R_2$ of the track 15a of concern.

Figure 6C:
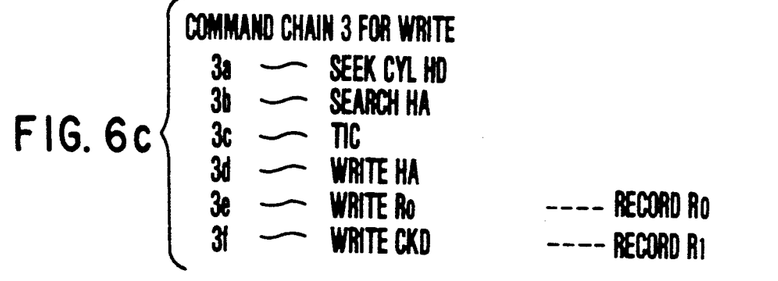

A command chain 3 for another write operation is substantially similar to the command chain 1 and differs from the latter in that the format write operation is caused to be performed up to only the record $R_1$ in response to the last WRITE CKD command 3f.

Figure 6D:
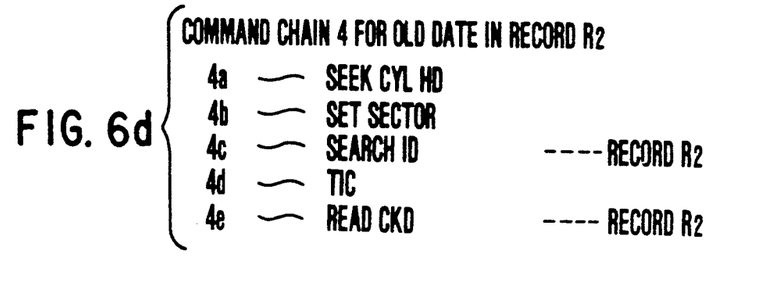

Finally, a command chain 4 for another read operation is composed of a SEEK CYL HD command 4a for moving the heads 16 to the cylinder 15b including the track 15a of concern, a SET SECTOR command 4b for realizing a rough positioning of the heads 16 directly to the record $R_2$ of concern on the track 15a, a SEARCH ID command 4c having as parameters the cylinder number CYL, the head number HD and the record number R for commanding the search of the count area $C_2$ of the record of concern (the record $R_2$ in this case), a TIC command 4d for allowing the abovementioned search operation to be repeated for a predetermined number of times and ensuring the time for completion of the search operation, and a READ CKD command 4e for allowing the record $R_2$ as found to be read out. Since the command chain 4 is disposed in succession to the rewrite command chain 3, erroneous access will be made to the incorrect data record $R_2$ which was not written by the format write operation in response to the command 3.

Referring to FIG. 4, the command chain 1 including a series of commands shown in FIG. 6(a) is issued to the magnetic disc systems 13a to 13c by the central processing unit 10 through the channel 11 and the magnetic disc controller 12 for performing write operation for a given track 15a up to the record $R_2$.

At that time, the magnetic disc controller 12 receives first the SEEK CYL HD command 1a of the command chain 1 through the channel 11 to drive the head positioning circuit 18 and the head positioning mechanism 17 to thereby position the heads 16 on the track of concern on the basis of the cylinder number CYL and the magnetic head number HD which are the parameters accompanying the command 1a, as the result of which the magnetic head 16 is positioned on the associated track.

Figure 2:
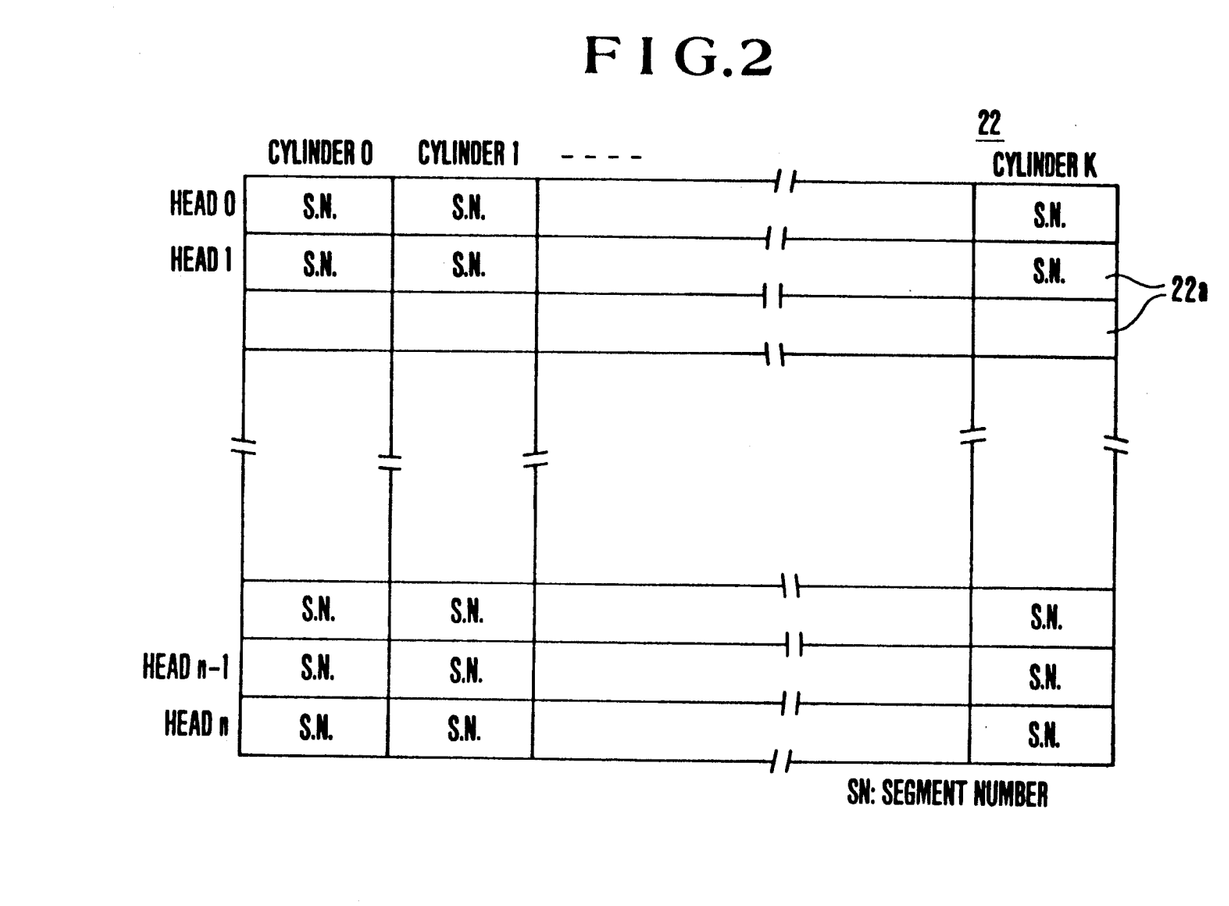
FIG. 2 is a view showing a structure of a segment number table employed as storage means in the system according to the present invention.

At the same time, the address signal 24 based on the cylinder number CYL and the magnetic head number HD which are the parameters of the SEEK CYL HD command 1a is sent out to the address latch 23, whereby the entry 22a of the segment table 22 corresponding to the track of concern is selected.

Next, the search of the home address HA in the track 15a commanded by the SEARCH HA command 1b is repeated for a predetermined number of times until it is successfully found by the TIC command 1c.

Figure 3:
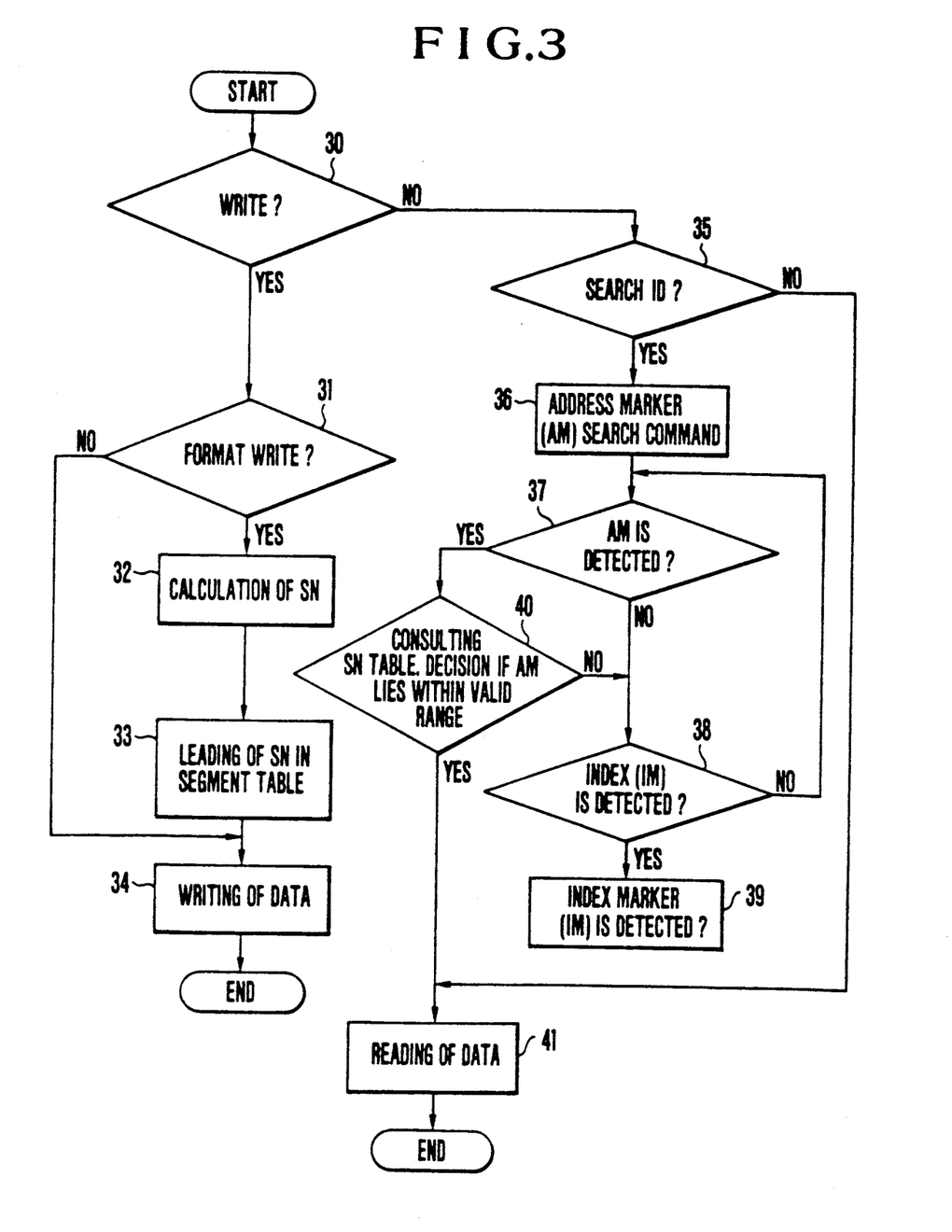
FIG. 3 is a flow diagram for illustrating, by way of example only, a magnetic disc system control method according to an embodiment of the present invention.

Subsequently, the WRITE HA command 1d is received, whereon decision is made as to whether the command is a write command or a read command (step 30).

In case the received command is found to be the write command, decision is then made as to whether the command is the format write command or not (step 31).

Unless the write command is the format write command, the ordinary data write operation for updating the key and the inherent data is performed (step 34).

At this time, however, the WRITE HA command 1d is decided to be the format write operation command since the home address HA at which the control information is recorded as described hereinbefore is to be rewritten, whereon the segment number SN of the home address HA of concern is arithmetically determined (step 32). The calculated segment number SN is stored at the corresponding entry 22a of the segment table 22 (step 33), whereon the writing of the home address HA is carried out (step 34).

Further, the WRITE $R_0$ command 1e succeeding to the WRITE HA command 1d is also decided to the format write command because the record $R_0$ stores the specific control information as described hereinbefore, whereon the segment number SN of the count area $C_0$ of the record $R_0$ is arithmetically determined by adding to the length of the home address HA the lengths of the gap $G_2'$ and the count area $C_0$, respectively, to be written instead of the segment number SN of the abovementioned home address HA, while writing operation is also performed for the count area $C_0$ and the data area $D_0$ (step 34).

Similarly, the WRITE CKD commands 1f and 1g succeeding to the WRITE $R_0$ command 1e and including the counts of the records $R_1$ and $R_2$, respectively, are also decided to be the format write command because of necessity for the rewriting if the respective count areas in which the control information described previously is recorded, whereon the abovementioned steps 32 and 33 are executed to perform the arithmetic operations for newly determining the segment numbers SN by adding the gap lengths, key lengths $K_l$ and the data lengths $D_l$ sequentially to the segment numbers SN of the immediately preceding records ($R_0$ and $R_1$ in this case), respectively. In this way, upon completion of execution of the last WRITE CKD command 1g, the segment number SN of the count $C_2$ of the record $R_2$ is recorded at the relevant entry 22a in the segment table 22.

In other words, assuming for simplification of the description that the segment number SN of the home address HA on the track 15a shown in FIG. 4 is "50" and that the segment numbers SN of the count areas $C_0$ to $C_2$ of the records $R_1$ to $R_2$ are "100", "200" and "300", respectively, then the content of the entry 22a of the segment table 22 corresponding to the track 15a is "300" which represents the segment number SN of the last record $R_2$ undergone the format write operation by the WRITE CKD command 1g at the time when execution of the command chain 1 has been completed.

In this conjunction, it should be mentioned that the format write operation is performed as in the case of the abovementioned command chain 1. Accordingly, it will become necessary according to the prior art to invalidate the previous records remaining in succession to the last record $R_2$ by executing erasing operation up to the location of the index marker located at the rightmost end as viewed in FIG. 4. According to the instant embodiment of the present invention, however, the format write operation is completed after writing the record $R_2$ without need for executing the erasing operation and at this time point the completion of the format write operation command by the command chain 1 is reported to the magnetic disc controller 12.

When the record reading operation is to be performed for the track 15a for which the format write operation has been executed in the manner as described above, there arises no possibility that the invalid records possibly remaining in the track 15a in a region succeeding to the last record $R_2$ might be read out, provided that the position of the record to be read out is same as that of the last record $R_2$ written by the format write operation or located closer to the home address HA than the record $R_2$, whereby the normal read operation can be assured regardless of whether the erasing operation has been executed or not in succession to the format write operation.

In other words, when the track 15a is to be sequentially read out from the start thereof up to the record $R_2$ inclusive thereof as in the case of the command chain 2 illustrated in FIG. 6(b), data can correctly be read out without giving rise to any problems.

On the other hand, when the command chain 3 for performing the format write operation only up to the record $R_1$ located in precedence to the last record $R_2$ is to be executed for reformatting the track 15a for which the command chain 1 has been executed, the value of the segment number SN stored in the segment table 22 upon completion of writing operation for the record $R_1$ is "200", which thus means that the invalid previous record $R_2$ remains on the relevant track 15a of the segment table 22.

It is now assumed that the command chain 4 (see FIG. 6(d)) for reading the invalid record $R_2$ is erroneously issued in the state mentioned above. Even in that case, erroneous reading of the invalid record $R_2$ can be evaded through the operation described below according to the teachings of the invention incarnated in the instant embodiment.

At first, the magnetic disc controller 12 receives the first SEEK CYL HD command 4a from the channel 11 and sets the address signal 24 in the address latch 23 in accordance with the cylinder number CYL and the head number HD which are parameters of the SEEK command 4a, while selecting the entry 22a of the segment table 22 corresponding to the relevant track 15a.

Subsequently, in response to the SET SECTOR command 4b, the head 16 is positioned at a location which precedes to the target position on the track 15a by a predetermined distance (during this phase of operation, the disc controller is released). Further, decision is made as to whether the received command is a write command or a read command (step 30). When it is the read command, it is then decided whether it is the ID search command for searching the count area of the record of concern (step 35).

When the command is decided to be the ID search command such as the SEARCH ID command 4c, then the address marker (AM) detecting circuit 20 of the magnetic disc system 13a–13c is commanded to search the address marker AM indicating the start of the record of concern (step 36).

Then, decision is made as to whether the address mark of the record of concern is detected (step 37) and if not, decision is made as to whether the index marker IM has been reached (step 38). When the index marker IM is reached, an index processing for informing the magnetic disc controller 12 of the fact that the record of concern has not been found in the relevant track 15a is executed (step 39).

Upon reception of the address marker AM at the step 37, the AM detection circuit 20 compares the valid range for the format write operation for the track 15a of concern calculated on the basis of the segment number SN stored at the entry 22a of the segment table 22 corresponding to the track 15a with the distance from the index marker IM of the record corresponding to the detected address marker AM (step 40). In case the position of the address marker AM of concern lies within the valid range, detection of the address marker AM of the record of concern is messaged to the magnetic disc controller 12 to cause the latter to perform the operation for reading the record existing within the valid range of the format write operation (step 41).

On the other hand, when it is decided that the distance of the address marker AM exceeds the valid range mentioned above, the message of detection of the address marker AM to the magnetic disc controller is inhibited, whereon detection of the index marker IM is waited for (step 38). Upon detection of the index marker IM, the index processing step 39 described hereinbefore is executed to inform the magnetic disc controller of the absence of the record of concern.

In the case of the instant embodiment, the segment number SN of the record $R_2$ of concern for which the search is commanded by the SEARCH ID command 4c in response to the command chain 4 is "300", while the value of segment number SN of the relevant entry 22a in the segment table 22 corresponding to the track 15a recorded upon execution of the format write operation in response to the command chain 3 is "200". Accordingly, the position of the record $R_2$ of concern exceeds the valid range realized by the format write operation. This means that the parameter ID is erroneously designated.

Thus, the message of detection of the address marker AM of the record $R_2$ from the AM detection circuit 20 is inhibited When the index marker IM is reached in the meanwhile, the index processing step 35 is executed, whereby failure in detection of the index marker and hence failure of the search of the record $R_2$ of concern is informed to the magnetic disc controller 12.

By virtue of the feature described above, the record $R_2$ left to remain due to omission of the erasing process in succession to the format write operation is dealt with as if the record $R_2$ were absent on the track, whereby the erroneous transfer of the record $R_2$ to the channel 11 can positively be evaded.

As will now be appreciated, according to the instant embodiment of the invention, there can be excluded the possibility that the invalid data remaining outside of the range for the format write operation on a given track 15a might erroneously be read out later on, and thus the processing for erasing the invalid data can be spared when the format write operation is performed.

Accordingly, the time taken for input/output of data to and from any given one of the magnetic disc systems 13a to 13c can be reduced by an amount of the time otherwise required for the erasure processing in succession to the format write operation, whereby utilization efficiency of the magnetic disc systems 13a to 13c as well as the data stored wherein can be correspondingly enhanced.

Besides, the amount of data transferred for a unit time between the plural magnetic disc systems 13a–13c and the device provided externally of the magnetic disc system can be correspondingly increased.

Ultimately the performance of the whole electronic computer system which employs the plural magnetic disc systems 13a to 13c as the external storage equipment can be improved.

Although the present invention has been described in concrete in conjunction with the illustrated embodiment, it should be understood that the present invention is never limited to such illustrative embodiment but various and numerous modifications and changes may readily occur to those skilled in the art without departing from the scope and spirit of the invention. It should further be understood that the present invention can equally be applied to an optical magnetic disc storage and a semiconductor disc system.

What is claimed is:

1. A method of controlling an access to data performed in response to a read command, wherein the data is recorded as a data record on a track of a recording medium of an external storage system, on the basis of a control information recorded on said track through a format writing operation, said track storing a plurality of data records, an address marker being associated with each data record, comprising the steps of:

at a time of recording data, storing in a semiconductor memory a length data indicating a position of the last control information recorded on the track of said recording medium in a format writing operation;

completing said format writing operation without erasing data of a succeeding area of said track;

at a time of reading data in response to the read command, detecting an address marker indicating each data record on a track of said recording medium;

detecting whether the read command for reading data on said track of said recording medium includes an access to data at a position exceeding the position represented by the length data based on information of a position associated with one of said detected address markers indicating a predetermined one of said plurality of data records on said track which corresponds to said position of the last control information;

executing an access to data when the detected address marker does not indicate that the position of the data to be accessed exceeds the position represented by the length data; and inhibiting executing the access to data on said track when the detected address marker indicates that the position of the data to be accessed exceeds the position represented by the length data.

2. A method of controlling an access to data according to claim 1, wherein data to be stored in a track of said recording medium includes a plurality of variable length records recorded in a count/key/data format containing count information, key information and data information as the control information, and wherein said length data is stored in said semiconductor memory as a distance from the start of a track to the last control information recorded on that track.

* * * * *

UNITED STATES PATENT AND TRADEMARK OFFICE
CERTIFICATE OF CORRECTION

PATENT NO. : 5,315,447
DATED : May 24, 1994
INVENTOR(S) : Masahiro Nakayama, et al It is certified that error appears in the above-indentified patent and that said Letters Patent is hereby corrected as shown below:

Column 3, line 45, Change "the invention;" to --the present invention.--

Column 10, line 64, After "inhibited" insert --.--.

Signed and Sealed this

Twentieth Day of December, 1994

Attest:

BRUCE LEHMAN

*Attesting Officer*     *Commissioner of Patents and Trademarks*